US012734397B2

(12) United States Patent
Bujna et al.

(10) Patent No.: US 12,734,397 B2
(45) Date of Patent: Sep. 15, 2026

(54) OUTDOOR EXERCISE EQUIPMENT

(71) Applicant: ALPINE RUN LLC, New York, NY (US)

(72) Inventors: Zoltan Bujna, Komarno (SK); Xavier Giard, Pully (CH); Milan Cepregi, Komarno (SK)

(73) Assignee: ALPINE RUN, LLC, New York, NY (US)

( * ) Notice: Subject to any disclaimer, the term of this patent is extended or adjusted under 35 U.S.C. 154(b) by 148 days.

(21) Appl. No.: 18/711,403

(22) PCT Filed: Nov. 18, 2022

(86) PCT No.: PCT/US2022/080151
§ 371 (c)(1),
(2) Date: May 17, 2024

(87) PCT Pub. No.: WO2023/092077
PCT Pub. Date: May 25, 2023

(65) Prior Publication Data
US 2025/0235740 A1 Jul. 24, 2025

Related U.S. Application Data

(60) Provisional application No. 63/264,266, filed on Nov. 18, 2021.

(51) Int. Cl.
*A63B 22/00* (2006.01)
*B62M 3/00* (2006.01)
*F16C 33/20* (2006.01)

(52) U.S. Cl.
CPC .......... *A63B 22/0046* (2013.01); *B62M 3/00* (2013.01); *F16C 33/201* (2013.01); *F16C 2208/78* (2013.01)

(58) Field of Classification Search
CPC ........... A63B 22/0046; A63B 22/0048; A63B 2022/0053
See application file for complete search history.

(56) References Cited

U.S. PATENT DOCUMENTS 4,446,754 A 5/1984 Chattin
4,519,271 A 5/1985 Chattin
5,228,710 A 7/1993 Lu
6,830,259 B2 * 12/2004 Jakovljevic .............. B62M 3/04 280/260
2004/0150186 A1 8/2004 Jakovljevic
(Continued)

FOREIGN PATENT DOCUMENTS

FR 2971314 A1 8/2012
TW M446152 U * 2/2013
TW M446152 U1 2/2013

OTHER PUBLICATIONS

International Search Report & Written Opinion mailed Apr. 10, 2023 for Intl. Pat. Appl. No. PCT/US22/80151.
(Continued)

*Primary Examiner* — Zachary T Moore
(74) *Attorney, Agent, or Firm* — Husch Blackwell LLP

(57) ABSTRACT

An outdoor exercise machine is disclosed having an articulation with an axle and a crankset, the axle having bushings made with an ultra-high-molecular-weight polyethylene (UHMWPE) treated with molybdenum disulfide (MoS2).

16 Claims, 10 Drawing Sheets

(56) References Cited

U.S. PATENT DOCUMENTS

| | | | | |
|---|---|---|---|---|
| 2010/0304907 | A1 * | 12/2010 | Yuan ......................... | F16D 3/74<br>464/73 |
| 2016/0023081 | A1 | 1/2016 | Popa-Simil | |

OTHER PUBLICATIONS

Translation of TWM446152.
Translation of FR2971314.

* cited by examiner 56
54
55
57
57
15.9
Ø 30
Ø 9
Ø 29 (2x)
Ø 30
15
24
210
258
15

OUTDOOR EXERCISE EQUIPMENT

CROSS REFERENCE

This application is a U.S. National Phase Application of International Application No. PCT/US2022/080151 filed Nov. 18, 2022, which claims the priority of U.S. Provisional Patent Application No. 63/264,266 filed Nov. 18, 2021, the entire disclosures of which are hereby incorporated by reference.

TECHNICAL FIELD

The disclosure herein generally relates to outdoor exercise machines. More specifically, the disclosure relates to improved articulations for outdoor exercise machines that may be kept outdoors or in conditions promoting corrosion and need for service.

BACKGROUND

Conventional outdoor exercise machines use ball bearings at their articulation points. Various types of outdoor exercise machines are known in the art, and include Surf Machines, Airwalkers, Balance Wheels, Crosstrainers, Pull-Down, and Shoulder Wheels, all of which are known to use ball bearings at their articulation points. Over time, any ball bearing (except for the extremely pricey ones in ceramic or stainless steel) will corrode, start making noise, and begin griping. Bronze bushings, an alternative to ball bearings, are not durable and make noise. Certain machines, such as the Airwalker and Surf Machines, may also allow a user to over-extend when in use, leading to injury.

Accordingly, what is needed is an improved, more robust articulation. The articulation should be corrosion-resistant and have a long life span.

In addition, fitted key articulation assemblies have an axle and a fitted key to be pushed inside the axle holder in the crankset for assembly and service. A solid link requires a very small tolerance between the axle and the holder. For example, an H4 tolerance may be used where a hole with a 29.9 mm diameter receives an axle with a 30.0 mm diameter. While sturdy, once maintenance is required, a special tool is required to open the assembly. Accordingly, an improved articulation assembly where a solid link is established between an axle and the two cranksets, while simultaneously being easy to assemble/disassemble for service is desirable.

Furthermore, many conventional outdoor exercise machines do not include safety features that prevent over-extension of the user. Some machines use external swing limitation features, but they present the risk of pinching a finger or other body part.

SUMMARY

For these and other reasons known to a person of an ordinary skill in the art, what is needed is improved articulations.

Such improved articulations can include smooth stainless steel precision rods and polymer insert which is directly inspired by the medical world where it is used for hip replacement or joint replacement.

Such improved articulations can also include improved geometry which provides for easier serviceability, while not sacrificing robustness.

In addition, improved articulations may provide a tighter liaison between the crankset and the axle to ensure smooth functionality.

Such improved articulations can also include user safety features that prevent overextension by the user.

DETAILED DESCRIPTION

Figure 1:
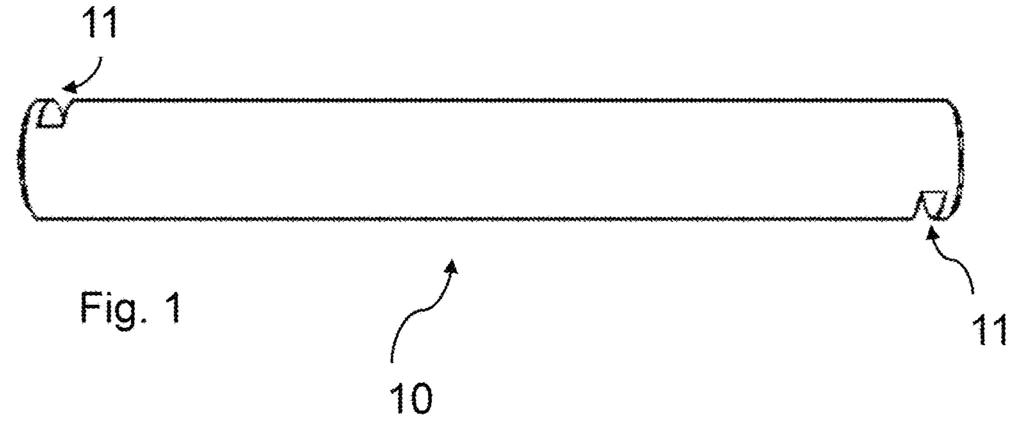
FIG. 1 is a side view of an axle.
Figure 3:
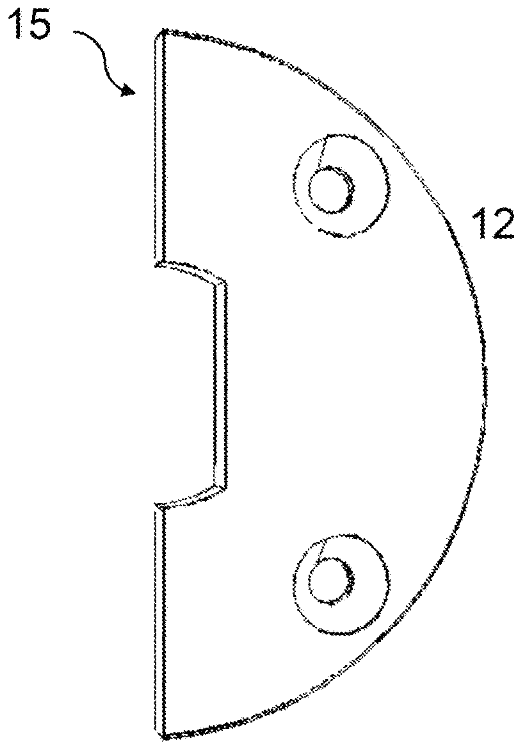
FIG. 3 is an isometric view of an axle connector.
Figure 2:
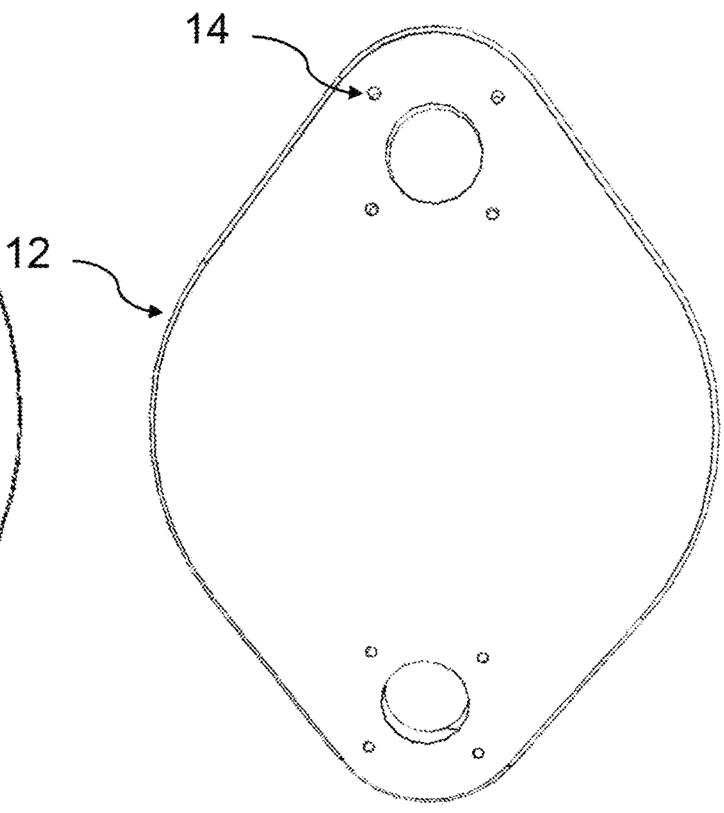
FIG. 2 is a front view of a crankset.

Conventional outdoor exercise machine articulations use ball bearings. The present disclosure makes use of a polymer chosen for a bushing of an outdoor exercise machine articulation that should work in all temperatures (−30° C. to 100° C.), all humidity ranges (10-100%), and should have a very low friction coefficient, good corrosion, and abrasion resistance. The polymer should have extremely low water absorbance. An appropriate polymer should have a tensile and yield strength of at least 2 MPa to handle normal use forces and stresses.

In one embodiment of the invention, the polymer can be an ultra-high-molecular-weight polyethylene (UHMWPE). Molybdenum disulfide ($MoS_2$) may be added to the UHMWPE for improved friction and abrasion resistance. Bushing inserts may be made of the polymer with an inner diameter of 30 mm, an outer diameter of 52 mm, and a 20 mm thickness of the polymer ring. Bushing inserts may be made of the polymer with an inner diameter of 10-50 mm, or more preferably 20-40 mm, an outer diameter of 40-60 mm, and a 20-120 mm thickness of the polymer ring, or more preferably, 30-40 mm.

During production, the polymer must be carefully cooled down during the turning process to prevent overheating and change of the physical properties at the surface that has been turned. Failure to properly cool down the polymer during the turning process can lead to a polymer that wears off too quickly.

As shown in FIGS. 1-8, an axle 10, crankset 12, and axle connector 15 may be provided.

The axle 10 may be a stainless steel rod 22 mm or 30 mm in diameter rotating in polymer bushings. Alternatively, the axle 10 may a 10-50 mm diameter, to match the needs of its application in an outdoor exercise machine. The length of the axle may vary depending on the exercise, such as 114 mm, 239 mm, 341 mm, and 627 mm. A POSITA would understand that the length of the axle may be between 50 mm-1500 mm. The axle 10 may include grooves 11 at both ends.

The crankset 12 may include an axle holder 13. The crankset 12 may also include mounting points 14 for axle connector 15 and/or an ornamental plate 16. The crankset may have a length of 340 mm, a width of 250 mm, and a thickness of 10 mm. These dimensions may vary, such as to have a length of 150-500 mm, a width of 150-400 mm, and a thickness of 5 mm-25 mm.

Figure 4:
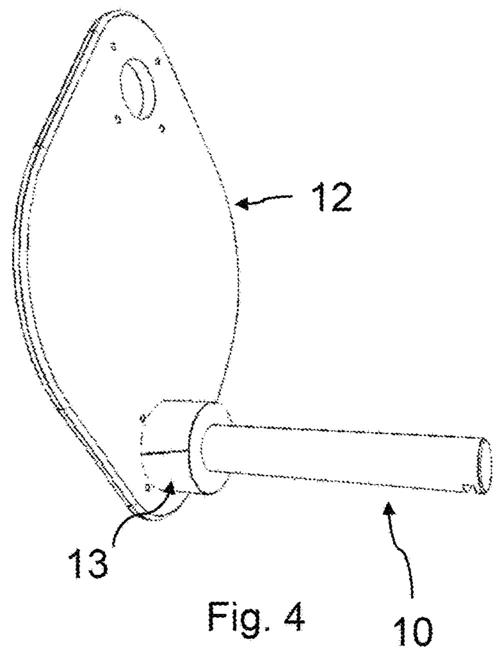
FIG. 4 is an isometric view of the axle of FIG. 1 with the crankset of FIG. 2.
Figure 5:
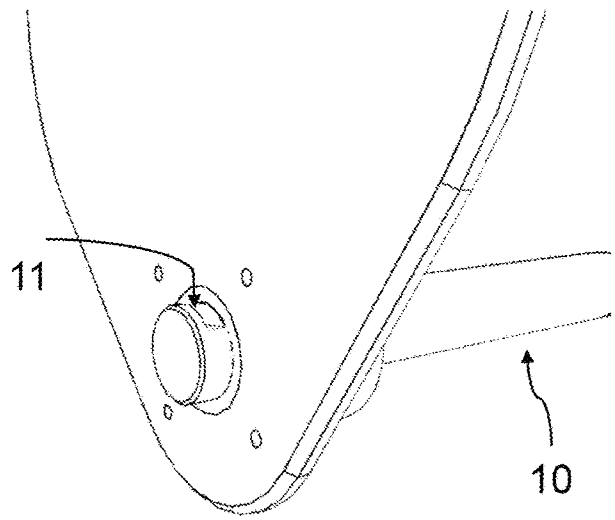
FIG. 5 is a zoomed in isometric view of the axle of FIG. 1 with the crankset of FIG. 2.
Figure 6:
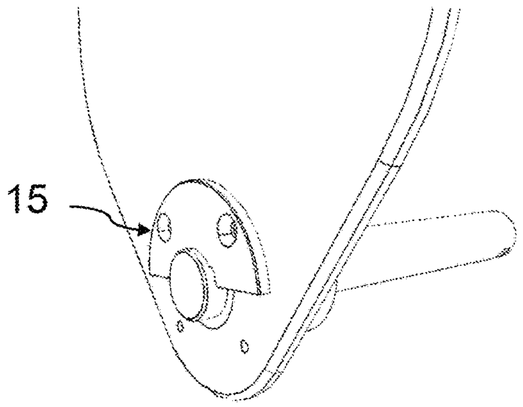
FIG. 6 shows the axle and crankset of FIG. 5 with the axle connector of FIG. 3 installed.
Figure 7:
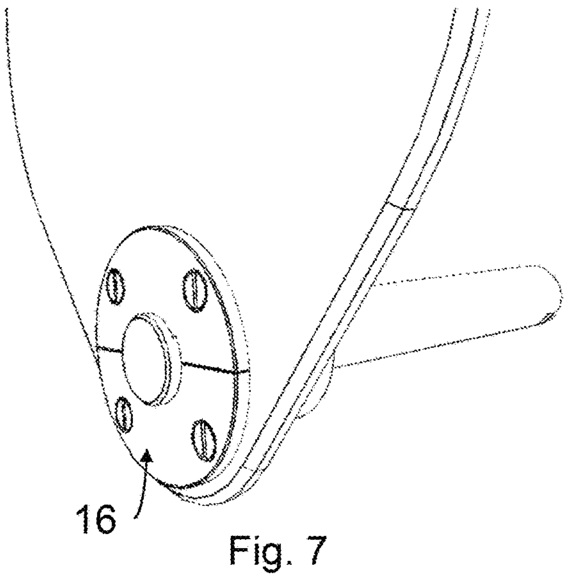
FIG. 7 shows the axle, crankset, and axle connector of FIG. 6, with an ornamental plate.

The axle 10 is inserted into the axle connector 15 such that the groove 11 extends to the other side of the crankset 12. The axle connector 15 is placed into the groove 11, and positioned to be connected to the crankset 12 (FIG. 4, 5). The connection between the axle connector 15 and the crankset may be made with screws or other secure connection (FIG. 6). An ornamental plate 16 may also be added (FIG. 7). Accordingly, use of a fitted key to link two cranksets with a stainless steel axle is not required, improving serviceability.

The axle connectors 15 may have an outer diameter of 60 mm, an inner diameter of 30.1 mm, and a length of 47 mm. These values may vary; the outer diameter may be 20-100 mm, the inner diameter may be 10-50 mm, and the length may be 25-75 mm.

The axle connector 15 and ornamental plate 16 may optionally have a patterned surface, with a corresponding pattern on the crankset 12, to improve transfer of forces. The number of connectors (e.g., screws) used to connect the axle connector 15 to the ornamental plate 16 may be 4, 6 or any other known number to secure the connection.

Figure 8:
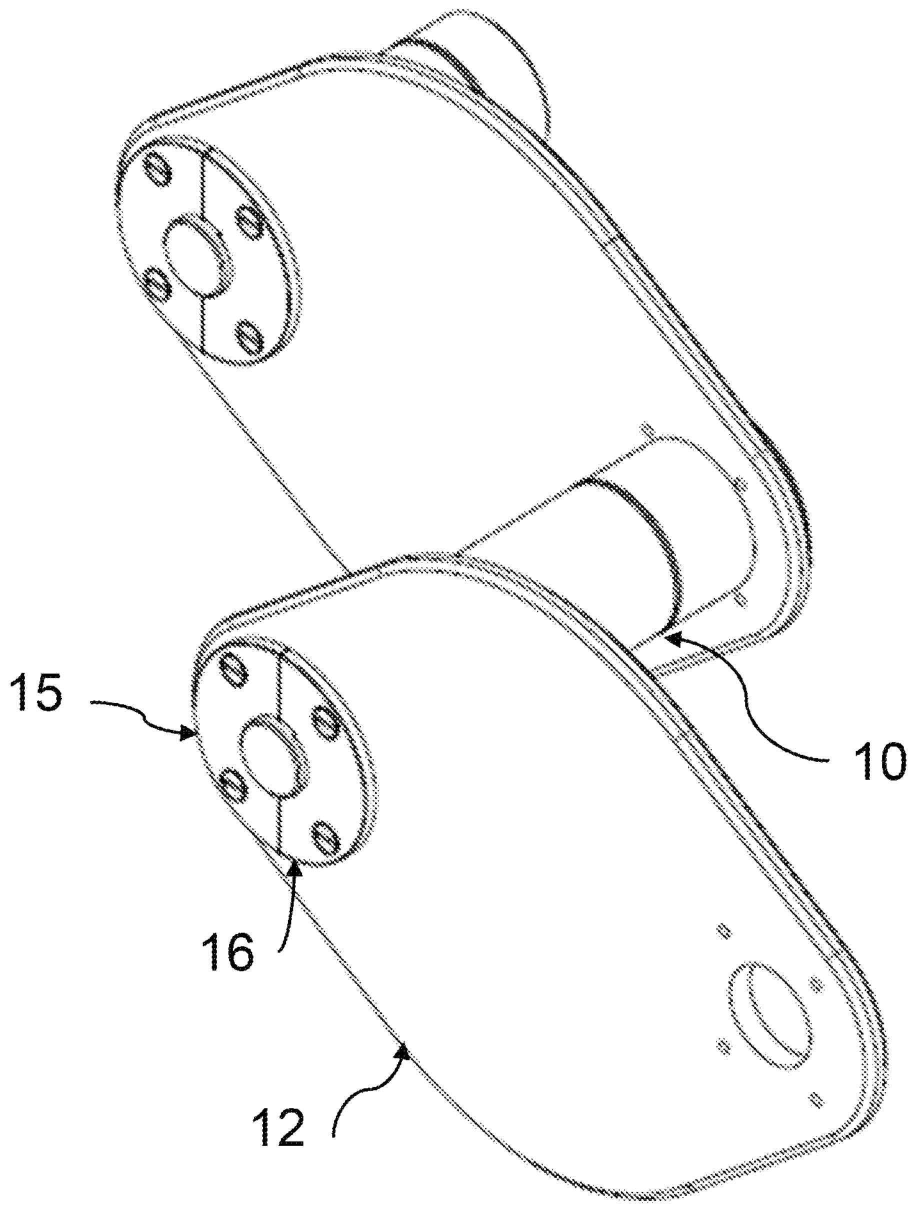
FIG. 8 shows a completed axle and crankset assembly.

Combining multiple axles and cranksets, such as shown in FIG. 8 creates a heavy assembly which can act as a flywheel and smooth exercise on outdoor exercise equipment, such as the Crosstrainer.

The articulation may alternatively or additionally have an internal stopping mechanism to prevent injuries to the user. As shown in FIGS. 9-12, an articulation is provided. The axle 1 at one end is kept in place by a stainless-steel end cap 7 and linked together by a spring pin 11. Gliding rings 6 may be used to help prevent friction between metal parts, and may be made of Teflon (PTFE). At the other end, the axle 1 is rotatably connected (via either a traditional fitted key 10 or the systems described above in FIGS. 1-22) to a rotating/oscillating part 8 (e.g., a platform where the user stands or footrest, depending on the machine). This end of the construction is secured by a stainless-steel disc 9 that is fixed to the axle by a screw. This way the axle 1 is held in place and the construction properly fitted together.

The axle 1 may have a stop 4 positioned on a non-rotating portion, static part 3. For example, a center piece 3 has two polymer bushings 5 and a stop 4. If the axle were to rotate too far, the stop 4 and one of the wings 2 would come into contact and prevent further rotation of the axle 1. As can be understood, this system to prevent injuries can be used with a conventional ball bearing articulation or the polymer articulation discussed herein.

Figure 9:
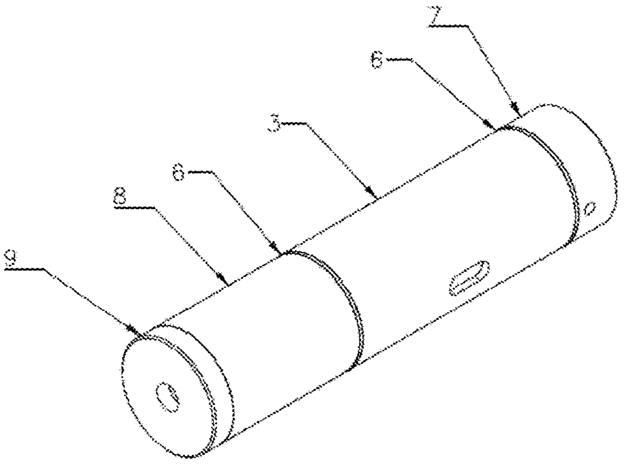
FIG. 9 shows an isometric view of an articulation including a safety feature.
Figure 10:
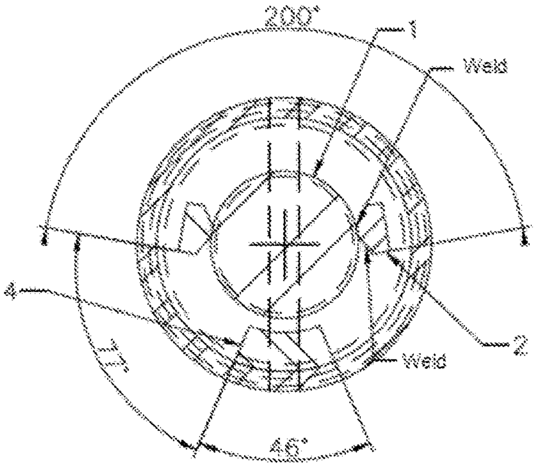
FIG. 10 shows an end cross sectional view of the articulation including a safety feature of FIG. 8.
Figure 11:
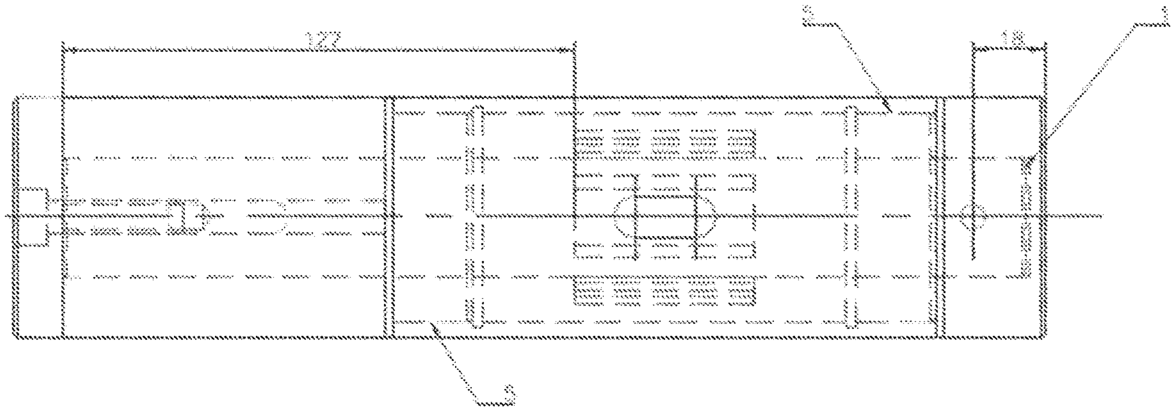
FIG. 11 shows a top internal cross section of the articulation including a safety feature of FIG. 8.
Figure 12:
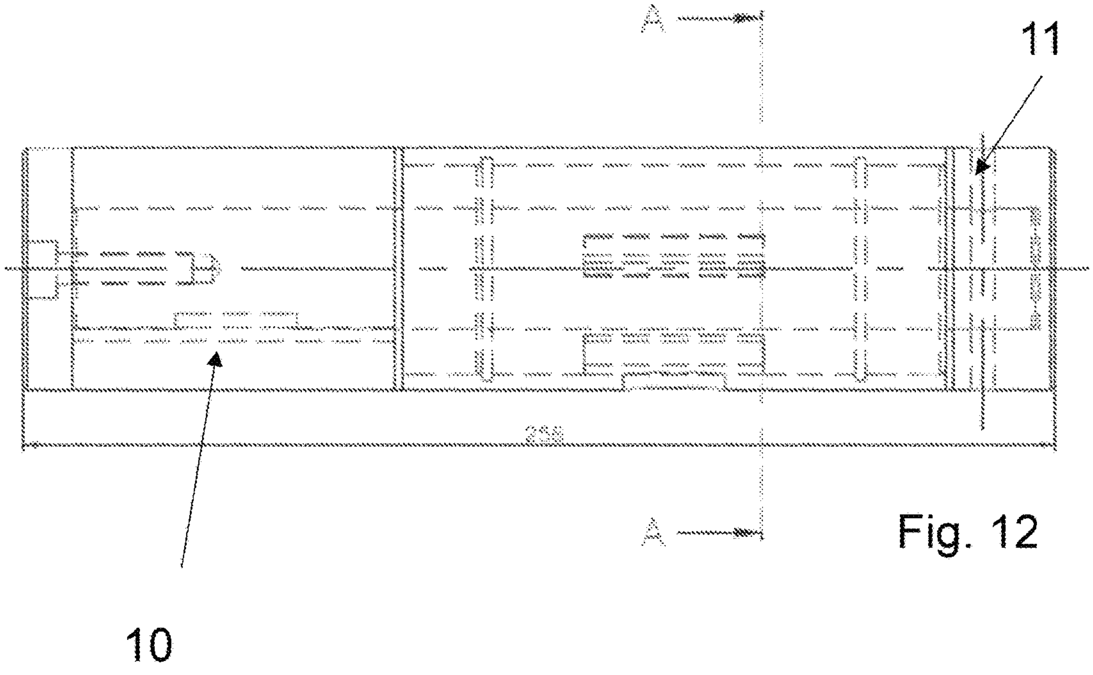
FIG. 12 shows a side internal cross section of the articulation including a safety feature of FIG. 8.
Figure 13:
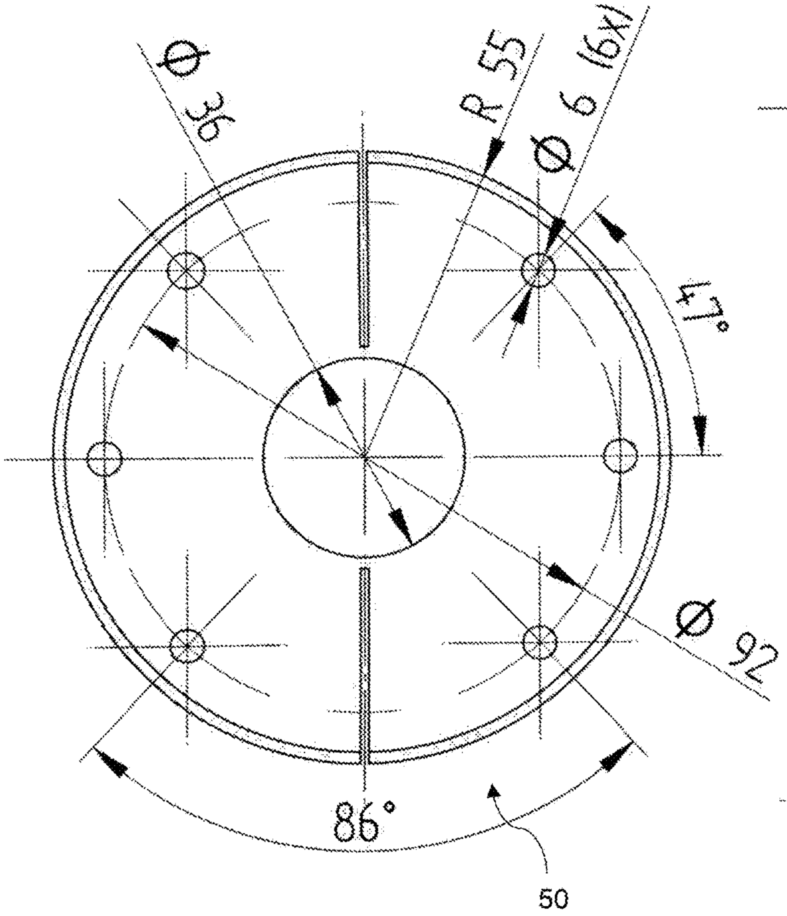
FIG. 13 shows a front view of a connector.
Figure 14:
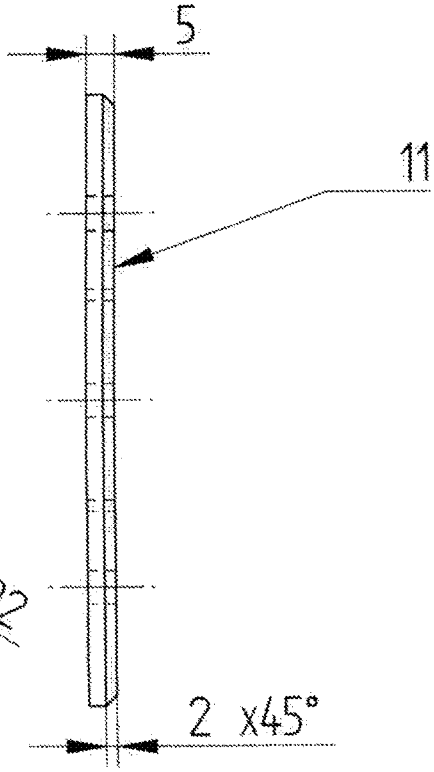
FIG. 14 shows a side view the connector of FIG. 13.

As shown in FIG. 9, wings 2 may be welded to axle 1. They may have operating positions that are approximately 160 degrees apart. Accordingly, if stop 4 spans 46 degrees, the wings 2 prevent movement of more than 77 degrees in either direction, if stop 4 is centered. The length of stop 4 may be tuned to allow various degrees of freedom, from approximately 30 degrees to 160 degrees. The degree of freedom need not be symmetrical.

A single wing 2 may be used instead of two. Using a single wing 2 may allow for additional reinforcement and strength compared to two wings 2. In either case, wings 2 may be positioned anywhere along the axle, and have any width such that desired ranges of motion, from 0 to 360 degrees are attained.

The construction fixed to the crankset works like a claw in which the axle is secured. The tightness of the assembly is ensured by a screw that goes through the claw and the axle.

FIGS. 13-22 show another implementation of the present disclosure. The dimensions shown in FIGS. 13-22 are exemplary, and may vary according to specific needs and implementations. Connector 50, shown in FIGS. 13 and 14, has holes for attaching connector 50 to the crankset, such as the crankset shown in FIGS. 21 and 22.

Figure 16:
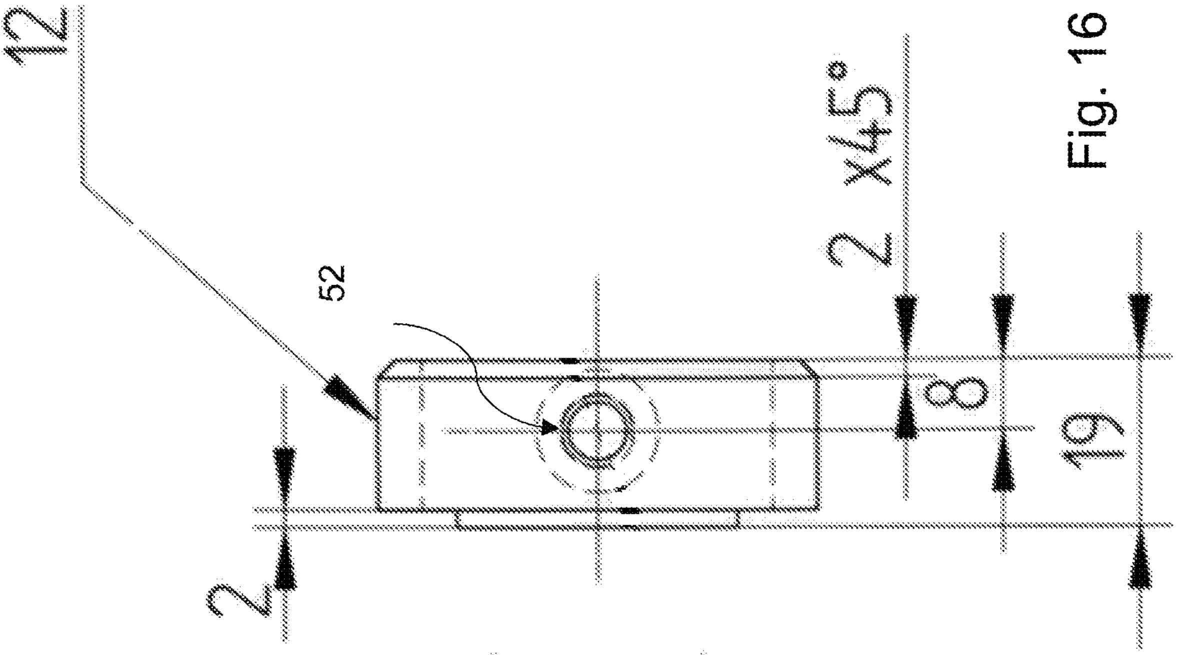
FIG. 16 shows a top view of the axle receiver of FIG. 15.
Figure 15:
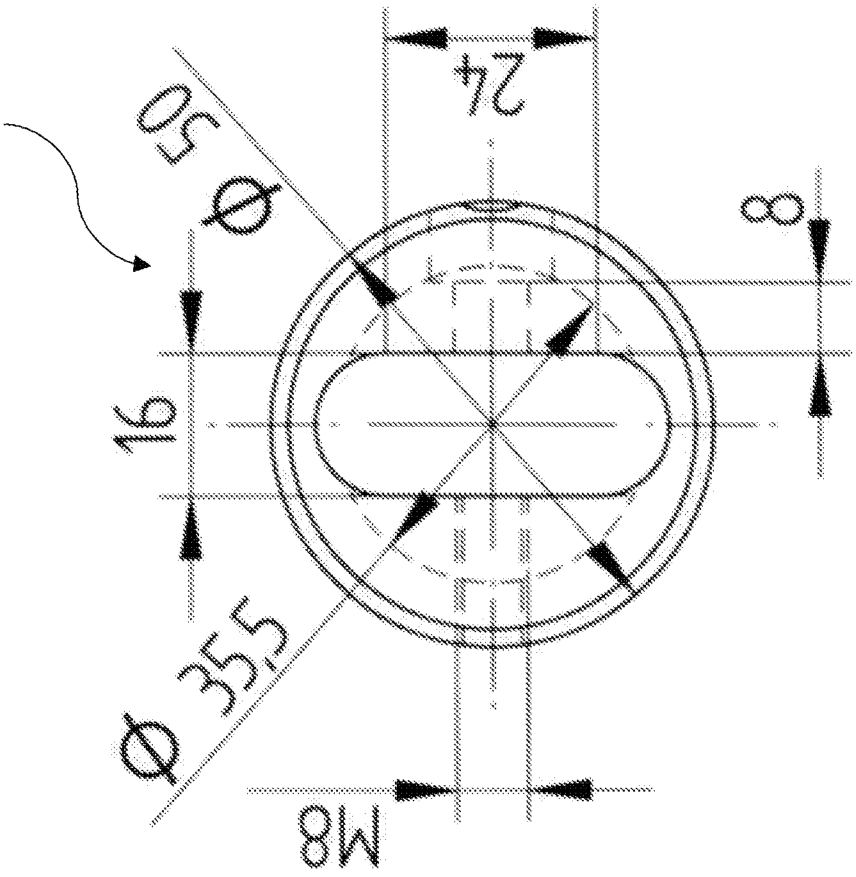
FIG. 15 shows a front view of an axle receiver.
Figure 17:
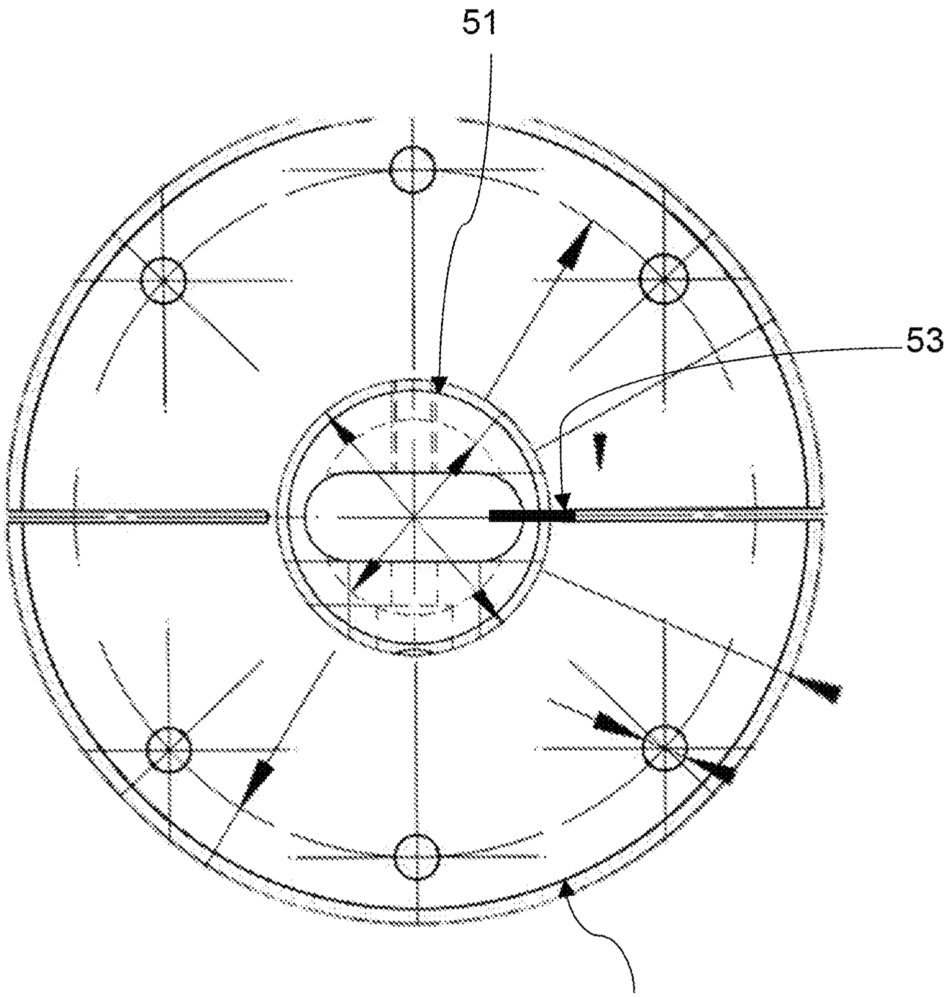
FIG. 17 shows a front view of the connector and axle receiver of FIGS. 13 and 15.

Axle receiver 51 is shown in FIGS. 15 and 16. Axle receiver 51 has a hole 52 drilled into it for receiving a fastener, such as a screw. Axle receiver 51 is welded to connector 50, which is shown in FIG. 17. The weld may only be a partial weld, such that a portion of axle receiver 51 is movable relative to connector 50.

A slit 53 is cut through the combined connector 50 and axle receiver 51. The slit 53 may allow some movement of the axle receiver 51 relative to the connector 50.

Figures 18, 19, 20:
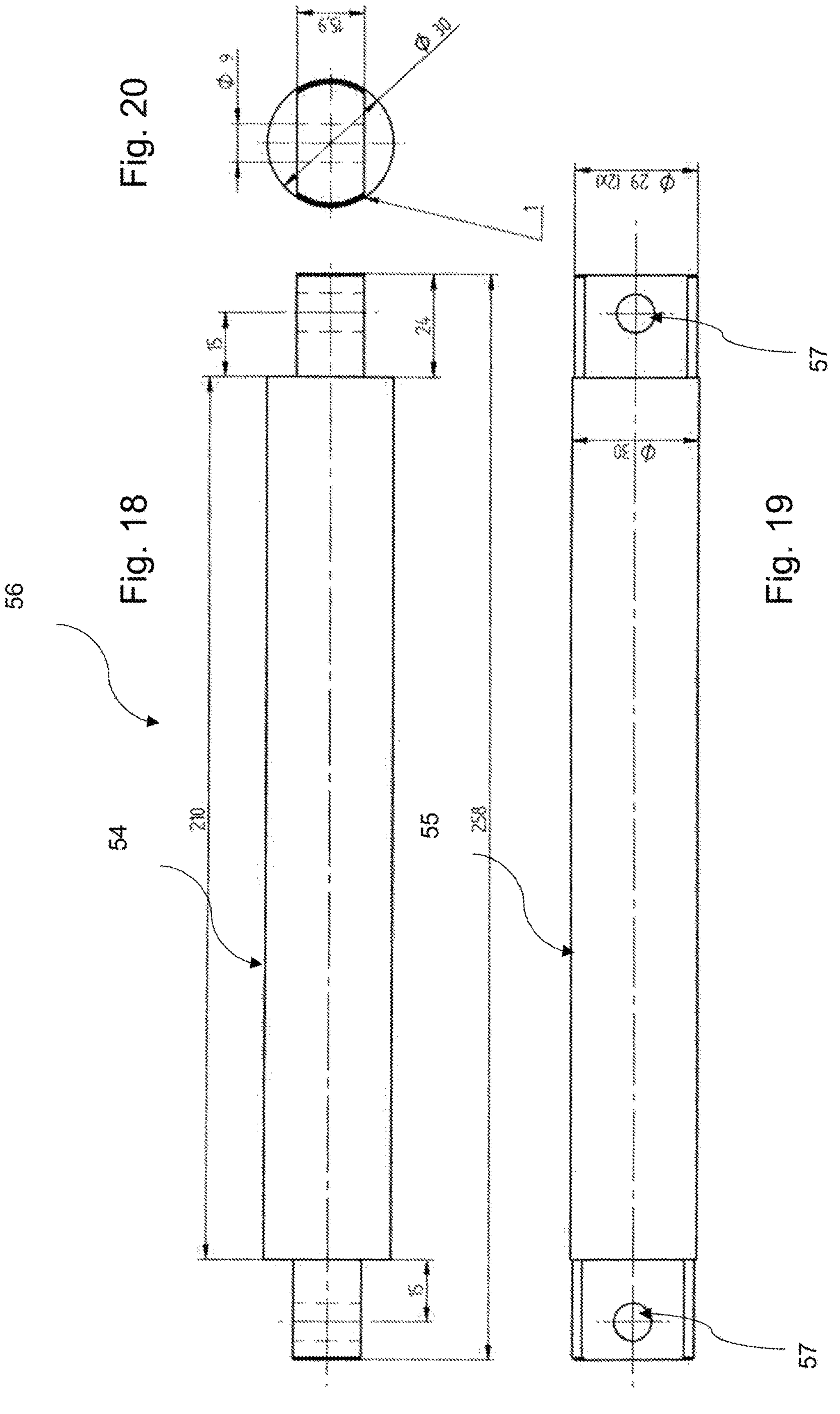
FIG. 18 shows a front view of an axle.
FIG. 19 shows a top view of the axle of FIG. 18.
FIG. 20 shows a side view of the axle of FIG. 18.
Figure 22:
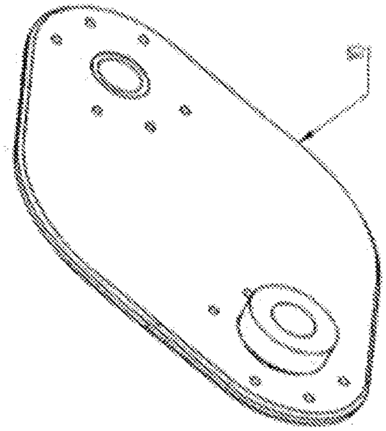
FIG. 22 shows a perspective view of the crankset of FIG. 21.
Figure 21:
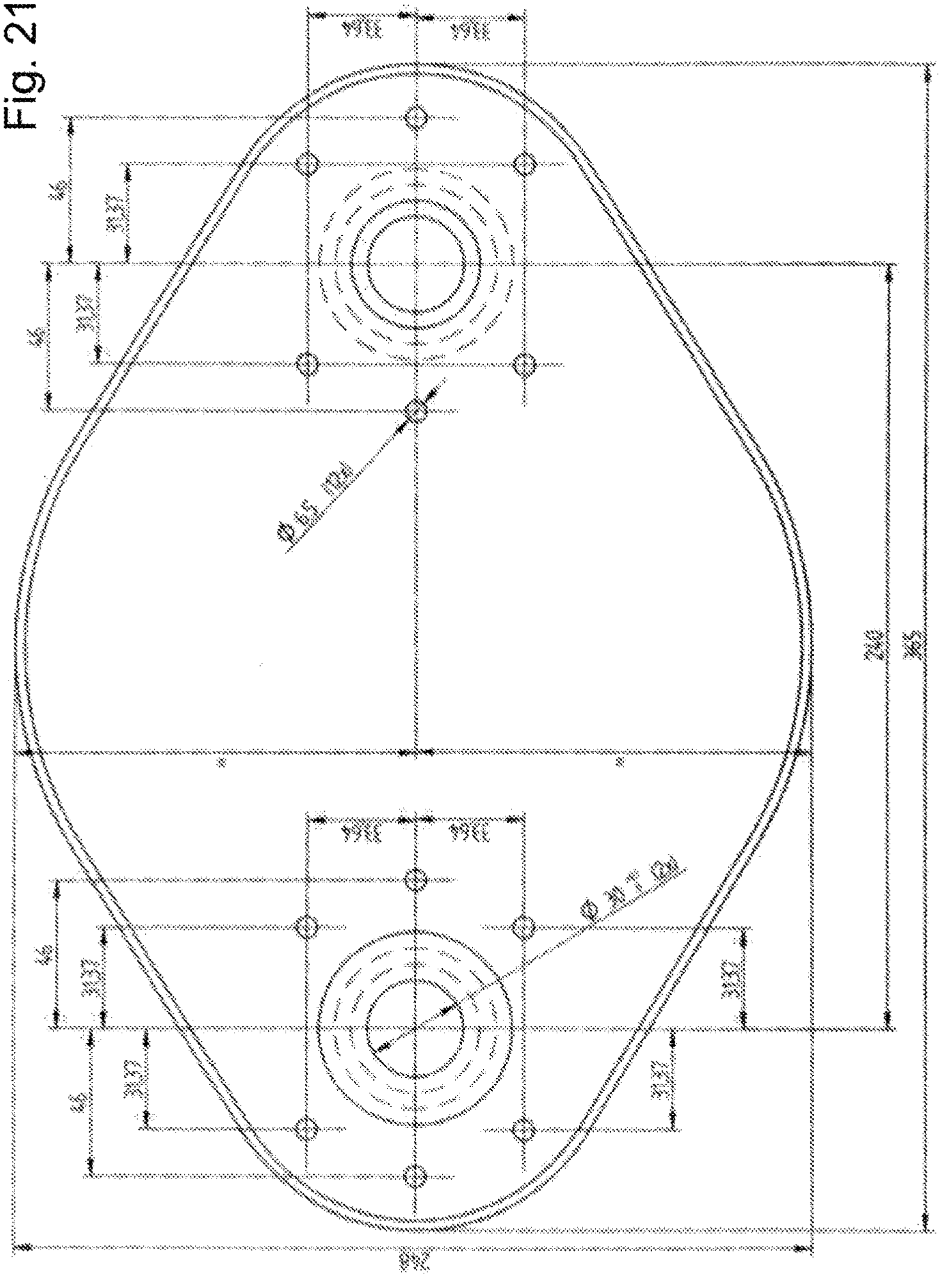
FIG. 21 shows a front view of a crankset to be used with the connector of FIG. 13, axle receive of FIG. 15, and axle of FIG. 18.

As shown in FIGS. 18-20, two ends 54, 55 of an axle 56 are milled to get a flat surface. A hole 57 is drilled in the axle 56.

The axle 56 is inserted into the axle receiver 51 such that holes 52 and 57 are aligned. The axle receiver 51 is tightened with a screw applying pressure on the axle to make sure that the axle receiver 51 is tightly secured around the axle, not leaving it any freedom to move.

Although the invention has been illustrated and described herein with reference to a preferred embodiment and a specific example thereof, it will be readily apparent to those of ordinary skill in the art that other embodiments and examples may perform similar functions and/or achieve user experiences. All such equivalent embodiments and examples are within the spirit and scope of the present invention, are contemplated thereby, and are intended to be covered by the disclosure.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention, and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention", unless context clearly indicates otherwise.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention. Furthermore, the specification should be read with the understanding that the virtual space, or spaces, and/or the number of participants using the invention simultaneously which are implied or described herein do not limit the scope of the invention.

We claim:

1. An outdoor exercise machine comprising:

an articulation;

the articulation having an axle and a crankset;

the crankset having a first side and a second side;

the axle extending along a first axis, and having a groove cut in a first side of the axle, the axle having a rotating portion and a non-rotating portion;

an axle connector for holding the axle to the crankset in a secured position;

wherein in the secured position:

the axle is placed through the crankset such that the groove is disposed on the first side of the crankset;

the axle connector is disposed in the groove;

the axle connector is fastened to the crankset;

wherein the non-rotating portion of the axle has a first stop disposed thereon, and wherein the rotating portion of the axle has a second stop and third stop disposed at first and second predetermined angles; and wherein when the rotating portion rotates to the first or second predetermined angle, the second or third stop contacts the first stop, and further rotation beyond the first or second angle is prevented.

2. The outdoor exercise machine of claim 1, wherein the axle connector is fastened to the crankset via a screw.

3. The outdoor exercise machine of claim 2, wherein the screw is inserted through the axle connector and into the crankset along an axis parallel to the first axis, and wherein the axle connector enters the groove in a direction perpendicular to the first axis.

4. The outdoor exercise machine of claim 1, further comprising bushings in the axle made with an ultra-high-molecular-weight polyethylene (UHMWPE) treated with molybdenum disulfide (MoS2).

5. An outdoor exercise machine comprising:

an articulation;

the articulation having an axle and a crankset;

the crankset having a first side and a second side;

the axle extending along a first axis and having a first receptor disposed thereon;

an axle connector for holding the axle to the crankset in a secured position;

the axle connector having a crankset connection piece and an axle reception piece;

the crankset connection piece having a plurality of fastener receptors for securing the crankset connection piece to the crankset;

the axle reception piece having a second receptor disposed thereon;

the crankset connection piece and the axle reception piece being disposed concentrically together such that the axle can pass through the crankset, the crankset connection piece, and into the axle reception piece;

wherein in the secured position:

the axle is placed through the crankset such that the first receptor and the second receptor are concentrically disposed on the first side of the crankset;

a fastener is disposed in the first receptor and the second receptor to secure the axle to the axle connection piece;

a plurality of fasteners disposed in the plurality of fastener receptors to secure the crankset connection piece to the crankset.

6. The outdoor exercise machine of claim 5, wherein the crankset connection piece is partially welded to the axle reception piece.

7. The outdoor exercise machine of claim 5, wherein the axle reception piece tightens around the axle when the fastener is tightened.

8. The outdoor exercise machine of claim 5, wherein at least one of the plurality of fasteners is a screw.

9. The outdoor exercise machine of claim 5, wherein the fastener is a screw.

10. The outdoor exercise machine of claim 5, further comprising bushings in the axle made with an ultra-high-molecular-weight polyethylene (UHMWPE) treated with molybdenum disulfide (MoS2).

11. The outdoor exercise machine of claim 5, wherein a screw is inserted through the axle reception piece and into the axle along an axis perpendicular to the first axis.

12. The outdoor exercise machine of claim 5, further comprising:

the axle having a rotating portion and a non-rotating portion;

the non-rotating portion having a first stop disposed thereon;

the rotating portion having a second and third stop disposed at first and second predetermined angles;

wherein when the rotating portion rotates to the first or second predetermined angle, the second or third stop contacts the first stop, and further rotation beyond the first or second angle is prevented.

13. An outdoor exercise machine comprising:

an articulation;

the articulation having an axle extending along a first axis and having a groove cut in a first side of the axle, and a crankset having a first side and a second side;

the axle having bushings made with an ultra-high-molecular-weight polyethylene (UHMWPE) treated with molybdenum disulfide ($MoS_2$); and an axle connector for holding the axle to the crankset in a secured position;

wherein in the secured position:

the axle is placed through the crankset such that the groove is disposed on the first side of the crankset;

the axle connector is disposed in the groove; and the axle connector is fastened to the crankset.

14. The outdoor exercise machine of claim 13, further comprising:

the axle having a rotating portion and a non-rotating portion;

the non-rotating portion having a first stop disposed thereon;

the rotating portion having a second and third stop disposed at first and second predetermined angles;

wherein when the rotating portion rotates to the first or second predetermined angle, the second or third stop contacts the first stop, and further rotation beyond the first or second angle is prevented.

15. The outdoor exercise machine of claim 13, further comprising:

the crankset having a first side and a second side;

the axle having a first receptor disposed thereon;

an axle connector for holding the axle to the crankset in a secured position;

the axle connector having a crankset connection piece and an axle reception piece;

the crankset connection piece having a plurality of fastener receptors for securing the crankset connection piece to the crankset;

the axle reception piece having a second receptor disposed thereon;

the crankset connection piece and the axle reception piece being disposed concentrically together such that the axle can pass through the crankset, the crankshaft connection piece, and into the axle reception piece;

wherein in the secured position:

the axle is placed through the crankset such that the first receptor and the second receptor are concentrically disposed on the first side of the crankset;

a fastener is disposed in the first receptor and the second receptor to secure the axle to the axle connection piece; and a plurality of fasteners disposed in the plurality of fastener receptors to secure the crankset connection piece to the crankset.

16. The outdoor exercise machine of claim 15, wherein the crankset connection piece is partially welded to the axle reception piece.

* * * * *